United States Patent [19]

Gunn

[11] 4,024,380
[45] May 17, 1977

[54] SELF SERVICE POSTAL APPARATUS AND METHOD

[76] Inventor: Damon Mott Gunn, 4007 49th St., Washington, D.C. 20016

[22] Filed: July 14, 1975

[21] Appl. No.: 595,646

Related U.S. Application Data

[63] Continuation-in-part of Ser. No. 107,421, Jan. 18, 1971, abandoned.

[52] U.S. Cl. .................... 235/61.9 A; 209/DIG. 1; 177/5; 235/151.2
[51] Int. Cl.² ................... G06K 1/12; B07C 5/34; G06F 15/56; G01G 23/38
[58] Field of Search .......... 235/61.7 B, 151.2, 101, 235/61.11 D, 61.11 E, 61.7 R, 61.9 R, 61.9 A, 61.12 N, 61.12 M; 177/5; 209/DIG. 1, 111.5; 250/566, 568, 569, 570; 340/149 R

[56] References Cited

UNITED STATES PATENTS

| | | | |
|---|---|---|---|
| 2,036,538 | 4/1936 | Pearson | 235/101 |
| 2,783,454 | 2/1957 | North | 340/149 R |
| 2,820,907 | 1/1958 | Silverman | 250/570 |
| 3,290,491 | 12/1966 | Wahlberg | 235/151.2 |
| 3,470,357 | 9/1969 | Ritzerfeld | 235/61.12 N |
| 3,635,297 | 1/1972 | Salava | 177/5 |
| 3,757,942 | 9/1973 | Gunn | 209/111.5 |
| 3,845,277 | 10/1974 | Voss | 235/61.7 B |
| 3,891,492 | 6/1975 | Watson | 235/61.12 R |

Primary Examiner—Robert M. Kilgore
Attorney, Agent, or Firm—Jim Zegeer

[57] ABSTRACT

There is disclosed a self service postal apparatus and method printing postage useable for sorting packages and other postal articles. On entering or dialing the zip code of the addressee a display of the geographic location thereof assures the user that the zip code number is accurate and it may, if desired, activate a computer to compute the postage due. After the customer pays the computed postage, the postage with the zip code of addressee therewith may be printed on the package or label in machine readable form useable for automatic mail sorting.

12 Claims, 8 Drawing Figures

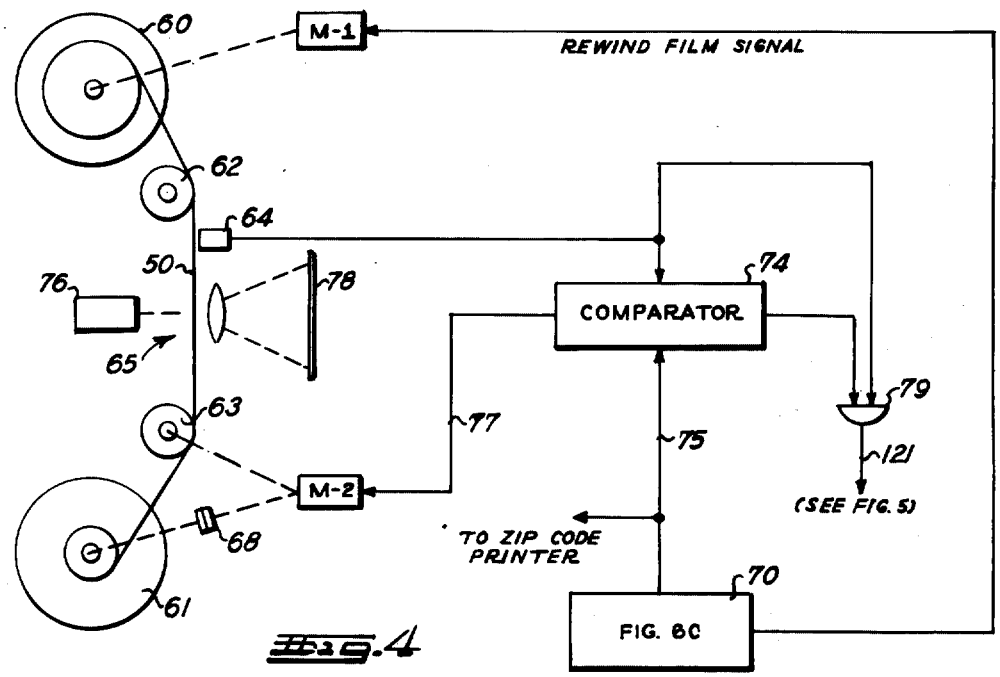
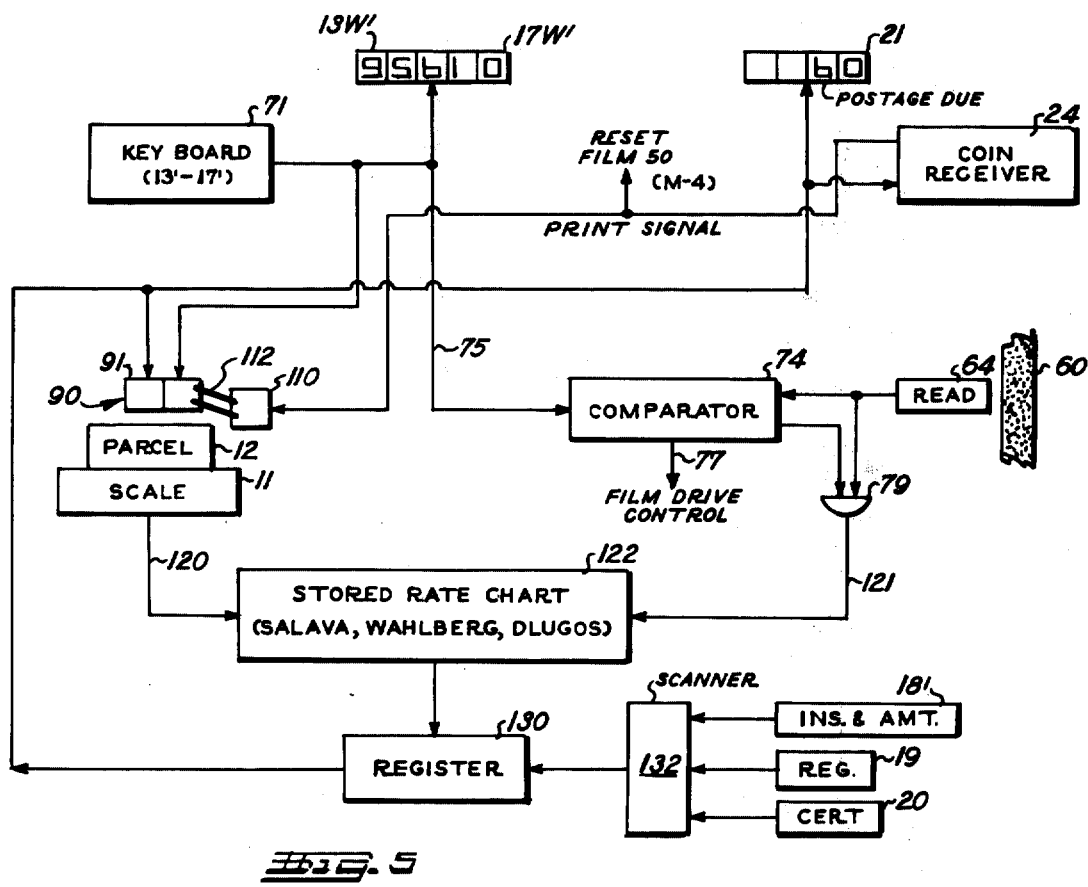

SELF SERVICE POSTAL APPARATUS AND METHOD

RELATED APPLICATION

This application is a continuation-in-part of my application Ser. No. 107,421 filed Jan. 18, 1971 entitled POSTAL APPARATUS AND METHOD, now abandoned.

BACKGROUND AND BRIEF DESCRIPTION OF THE INVENTION

The present invention is directed particularly to the field of self-service mailing of parcel post packages. It may use a special printed label having identifiable markings easily locatable and readable both electronically and by eye, as disclosed in my U.S. Pat. No. 3,757,942 entitled "Article Sorting Apparatus and Method".

Background material which expose the magnitude of posting and sorting mail, solved by self-service posting and mechanically sorting, is contained in the many publications of the Postal Service such as "Memorandum to Industry on Postal Needs" by H. F. Faught, Assistant Postmaster General (1970), and the "Proceedings of the United States Postal Service Conference", "Invitation to Industry" (1970) which were distributed to encourage industry to meet the needs of the Postal Service for handling mail. The Postal Service reports that there are some one half trillion sorts per year and one of the main purposes of this invention is to automate that sorting and to assist in providing stamps for mailing to facilitate that automatic sorting.

There are a large number of prior art disclosures and apparatus presently available which may have similar objectives as for example those referenced in my earlier application.

There are a number of prior art systems for computing and printing postage for one class of mail, (See U.S. Pats. Furlong No. 3,594,735, Salava No. 3,635,297, Adler No. 3,057,547 and Wahlberg No. 3,290,491), however the lines of customers waiting at post offices to mail packages show that such facilities do not provide a suitable apparatus and method for avoiding this congestion as would self-service mailing of parcels to post offices designated by zip codes. Moreover, none of the labels prepared furnishes means for automatically sorting packages. There are also prior art systems for mechanically preparing weight tickets issued by scales. They also do not include a combination to provide the means for computation of a charge as based upon stored factors corresponding to zip codes of addresses, to furnish a means for computing the amount for the postage label.

While the present invention is directed principally toward a method and apparatus for self-service mailing of packages and the sorting of same for distribution, it will be apparent that several features to be described later in detail, can be used to advantage in other article sorting systems, including envelopes as disclosed in my earlier application.

The object of this invention is to economically furnish a means for a customer to obtain quickly, easily, and accurately the amount to be paid for postage for his package and have the postage label printed with characteristics adapted for automatic sorting of the package with a view to saving labor.

In a simple preferred form the invention contemplates placing the package to be mailed into a pan-like tray or receiver means of a computer addressing scale. The customer enters the addressee's zip code, a multi-digit number, and weighs the article. The apparatus uses recorded data in an electronic data bank for all zip codes to obtain from the data bank a factor to be used by the apparatus to compute the amount of postage needed for the weight of the package. It prints the postage label which shows the amount along with the zip code of the addressee. The computer may also activate a display showing the postage due as well as other information such as the locality having the zip code entered as confirmation. The said stamp is placed on the article, and as the article is moved along a conveyor for sorting, furnishes the zip code marking readable by electronic sensors to activate gases for its sorting.

BRIEF DESCRIPTION OF THE DRAWING

The above and other features and advantages of the invention will become more apparent from the following specification taken in conjunction with the accompaning drawings wherein:

FIG. 4 is a diagrammatic view of apparatus illustrating specific components of the geographic display system and interconnection between the display and the data bank, FIG. 5 is a diagrammatic view of apparatus for computation of postage due and printing same and the printing of the machine readable zip code of FIG. 2 on a parcel.

DESCRIPTION OF PREFERRED EMBODIMENT OF THE INVENTION

Figure 1:
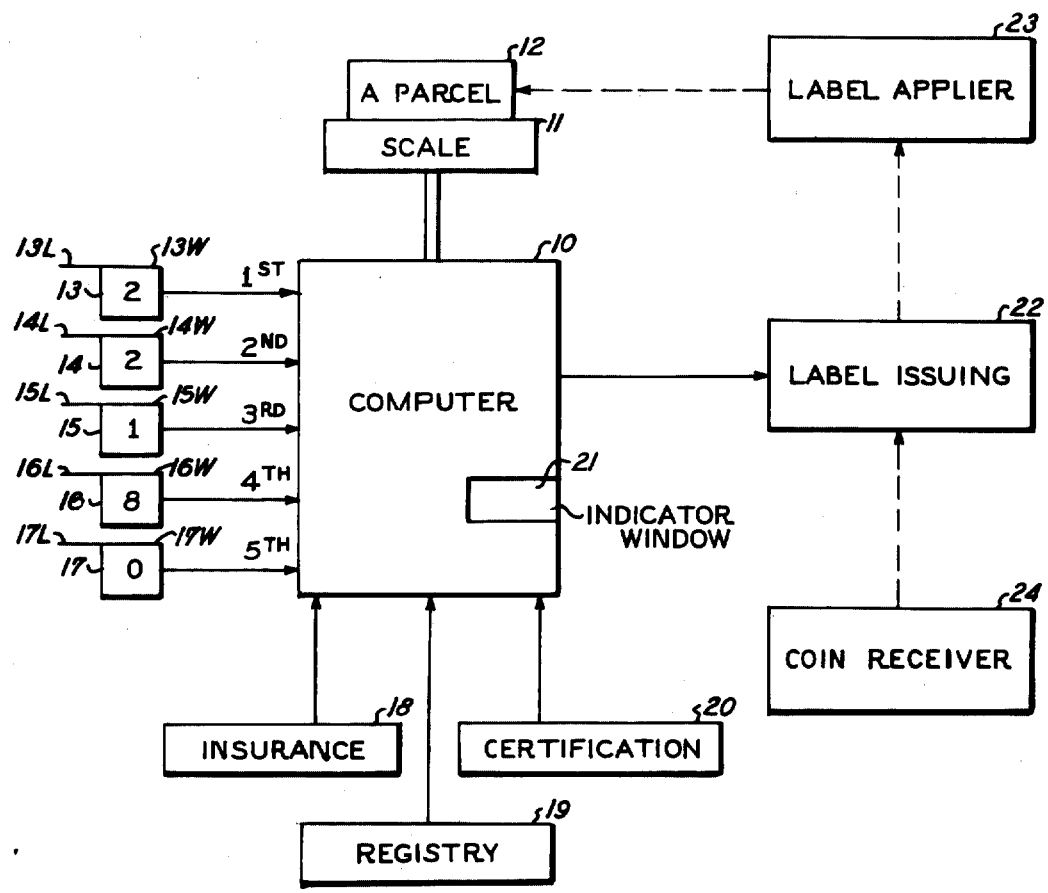
FIG. 1 is a block diagram of the apparatus incorporating my invention.

The present invention is directed to a parcel post mailer apparatus adapted to correctly prepare parcel postage indicia which carries the zip code of the addressee. The zip code is printed on the indicia so that it is at least machine readable to facilitate and speed up the sorting and forwarding of such parcels. The printing of the machine readable zip code indicia is directly related to the preparation of the postage indicia for the parcel. It prepares the indicia by using and automatically directing the information provided by dialing the zip code into the apparatus, to various places hereafter enumerated.

According to the invention after the parcel is placed on the scale pan 11 and the zip code is manually entered by means of lever switches 13–17 (corresponding to the first through the fifth digits in the zip code), the entry of the full zip code number manually into the switches sets up the zip code number for further uses. This manually entered zip code number is used in four different ways.

1. It is displayed in panel display windows 13W – 17W, inclusive.

2. It is used to access an electronic data bank which associates the zip code number with a geographical name and retrieves the geographical name of the addressee post office corresponding to that zip code. The signals for the geographical name are used to cause place name to appear on display panel 21 along with the digits of the zip code so that the customer can, and is, encouraged to check the zip code which he entered and literally sees that it is the correct one for the post office to which he wishes to send his parcel. This is a reinforcement in the mind of the self service customer that he has entered the correct zip code number and it also provides the means for positively associating same with the named geographical location or place to which the entered zip code has been assigned. This look up facility described later in relation to FIG. 4, is coupled directly to the zip code manually entered by the user to the system and this display of the postal address is a reinforcement to the user, thereby enhancing the credibility and accuracy of the system to the user and encourages and enhances the use of such a system.

As a specific example of this aspect of the invention, for the zip code 95610, the user would manually enter the zip code 95610 into the machine by setting encoding switch 13 to the numeral 9, the switch 14 to the numeral 5, the switch 15 to the numeral 6, the switch 16 to the numeral 1, and the switch 17 to the numeral 0. Automatically, the look up function is performed to simply look up and retrieve the geographical location to which that zip code number ("9-5-6-1-0") has been assigned. Thus, there is displayed to the user the following information:

ZIP CODE 95610 IS CITRUS HEIGHTS, CALIFORNIA

As a corollary to this entry it forces the use of the zip code by the postal patron because the postage indicia cannot be issued until the zip code number has been entered to the switches 13-17 (and, of course, the proper fee paid).

3. It goes to the postage indicia printer for a machine readable zip code entry on the postage. The zip code may be automatically translated to machine readable characters of the type shown in FIG. 2 or any other form to facilitate and expedite the sorting of parcels first by eye and later by machines.

My U.S. Pat. No. 3,757,942 shows in FIGS. 1, 2, 2A and 3 different ways in which the zip code may appear in the postage indicia. Features of that indicia are used in this invention. It may be placed in a special location so that the postal employee sorting will find it easily and can read the legibly printed zip code quickly. Such a feature is a step to the automatic sorting of parcels by having the zip code printed recognizable and readable by eye and electronic sensor. See U.S. Pat. No. 3,757,942, referred to above. Moreover, the fact that the zip code of the addressee post office is carried on the postage indicia for later processing or sorting of the parcel eliminates the further adding of the zip code to the address of the parcel as is now beginning to be effected at great expense by the Postal Service. As a further corollary to (3), indicia by being so marked, is self cancelled.

4. As shown in FIG. 1, it is used to access the electronic data bank to obtain a factor for computing (in a conventional way) the postage fee. After the apparatus determines from the weight of the article and the computation factor corresponding to the zip code, it calculates (in a conventional way) the postage due on the article for sending it to the addressee post office. Signals for this go to two places; (one) they are supplied to the label or indicia issuing unit. This sets up the amount for the unit to issue and (two) it produces signals to indicate this amount in window 21. After the amount of money for the postage has been deposited in the coin receiver 24 it activates the label issuing unit 22 to produce the postage indicia. Thus, by generating the machine readable zip code at the point of entry of an article into the postal system, there is provided an expeditious and non-obvious point for printing and application of the zip code on the article per se. As shown in FIG. 1, there is an output from computer unit 10, which, quite obviously, includes a transmittal of information corresponding to the manual entry of the zip code to the switches 13L-17, to a label issuing mechanism 22. This label issuing device prints upon the label (or the article) the zip code in machine readable form and applies a label directly to the package at a very specific and identifiable location thereon. At the same time, the computer determines, from the weight of the article and the zip code, the postage due on the article. It also supplies this information to the label issuing unit, which sets up the postage due. A coin receiver 24 may be used to activate the label issuing unit 22 upon proper entry of the amount of coin into the receiver 24. If additional postal services are required, as, for example, insurance, registry, or certification, or a combination of all of these, these are added into the computation of the postage due. The amount may be received by an operator and/or a change receiver, such as change receiver 24.

As shown in FIG. 1, weighing means 11 has a receiving means 12 of the scale and may be a pan-like tray or receiver means in the shape of an inverted three-side pyramid lying nearly on one longer edge (not shown). The tray may have limiting sides (not shown) preventing the mailing of unauthorized sized packages.

Scale means 11 produces a first signal corresponding to the weight of article A and supplies this signal to computer 10. It will be appreciated that computer 10 may be digital or analog, in which case the signal inputs thereto would be digital or, if analog, converted to form suitable for use by computer 10. It also is apparent that computer 10 may be electrical, mechanical, etc.

The zip code number may be entered to computer 10 by many different ways, as for example, dials, push buttons, slide switches, lever, thumbwheel switches and the like. In the embodiment shown in FIG. 1, electrical lever switches 13, 14, 15, 16 and 17, each having a manually operated lever or thumbwheel operator 13L, 14L...17L and switches are preferably of the type well known in the computer and related arts, which converts the rotary position of a shaft to an electrical signal. As an example, the zip code number 22180 is shown as entered, each lever 13L, 14L,...17L having been manually positioned by a user. Each switch position is converted to an electrical signal and entered to computer 10. In FIG. 4 the zip code number is entered by means of a manual keyboard 71 which displays the digits entered in an electronic display and stores same for use in the code up function and printing of the machine readable zip code.

The computer 10 has a data bank which has recorded in it computation factors corresponding to the postal rate to the post office of all the zip code locations, said data bank being described more fully hereinafter. In general, it uses the factor for the post office designated by the zip code registered along with the signal showing the weight of the article to compute the postage due on the article which had been placed on the receiver 12. The amount of this computed postage may be shown at the indicator window 21. When the amount shown in the window has been recorded as paid, as by coins in coin receiver 21, a label or stamp issuing means 22 (110 FIG. 5) prints the postage along with the zip code of the addressee as a stamp or label for the article. The stamp is affixed to the article either manually or delivered mechanically by the label or stamp applier means 23 through the opening in the bottom (not shown) of the receiver 12 to the article (in the embodiment of FIG. 6C, a print assembly is positioned over the parcel).

Upon deposit of the proper amount of money (or approved credit card) in mechanical coin or money receiver 24 a signal is sent to the printer 22. The form of the postage printed may be of the kind disclosed in my earlier patent which may be used in connection with the mechanical sorting of articles as disclosed therein.

In addition to the basic computation made from the weight and class of the article and distance to addressee, as described above, postage for additional special postal services may be entered into the computation of the total charge for the transaction. Thus, if the customer desires other service such as Air Mail, registry, or insurance, etc., he may register them on other data entry devices 18, 19, and 20 appropriately marked on the unit which are also connected to the computer data bank. After the postage fees due as indicated in window 21, is deposited in coin receiver 24, this unit activates the printing of a stamp showing the zip code of the addressee and the amount of postage computed. As in the above-identified application, this may be printed with a material different from the writing on the rest of the stamp but easily sensed electronically. If a separate stamp is printed the postal clerk or the customer affixes it at the upper right hand corner or the package, parallel to the upper edge, as is now customary. The stamp may be printed or placed through the slot (not shown) in the bottom of the receiver 12 on the package by having the package, properly held by the partition in the receiver, upside down therein. If desired, a second printing of the stamp can be a receipt.

The zip code is entered as described above, and when adequate money as indicated at the indicator window 21 is placed in the coin receiver 24, the apparatus prints inverted the postage with zip code on the package at the slot.

Figure 2:
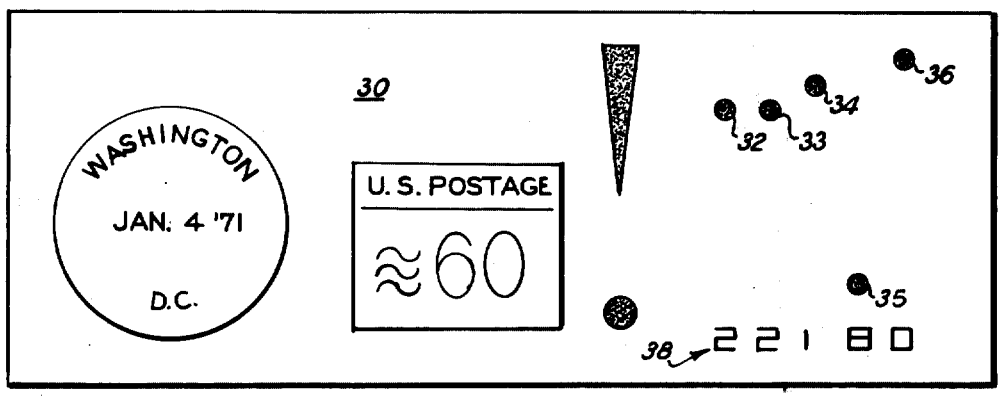
FIG. 2 illustrates a postage label produced by the apparatus of FIG. 1 incorporating identifying marks for locating the marked zip code of the addressee.

FIG. 2 shows a form of the postage label 30 which may be printed either on a separate surface to be applied to the article or as an impression stamp on the article each by the apparatus as represented by 22 of FIG. 1. As greater uniformity in the production of the zip code by such a machine printer may be expected than by hand, the row or numerals 38 as printed may furnish enough of a definite reference base that they may be read as code dots as disclosed in FIG. 2A of my above identified patent. Greater facility and accuracy in locating the printing will result if another material, such as of a flourescent or a brilliant color is used for the stamp as a whole and is used as a reference base. Also the placing of the dots 32, 33, 34, 35, and 36 (95, 96, 97, 98 and 99 of FIG. 6A) to indicate the zip code, makes for greater accuracy in reading the zip code. The location can be referenced to the printed numerals of the amount of postage which would be printed in an ink, sensed differently from the ink used to print the zip code, so the reader would not be confused by the numerals for the postage. Furthermore as this postage label is prepared by an apparatus which must have the addressee's zip code in order to compute the amount of postage, that fact makes the printing or application of this zip code an economically feasible method for producing a postage label which in turn can be effectively used for sorting articles.

Figure 3:
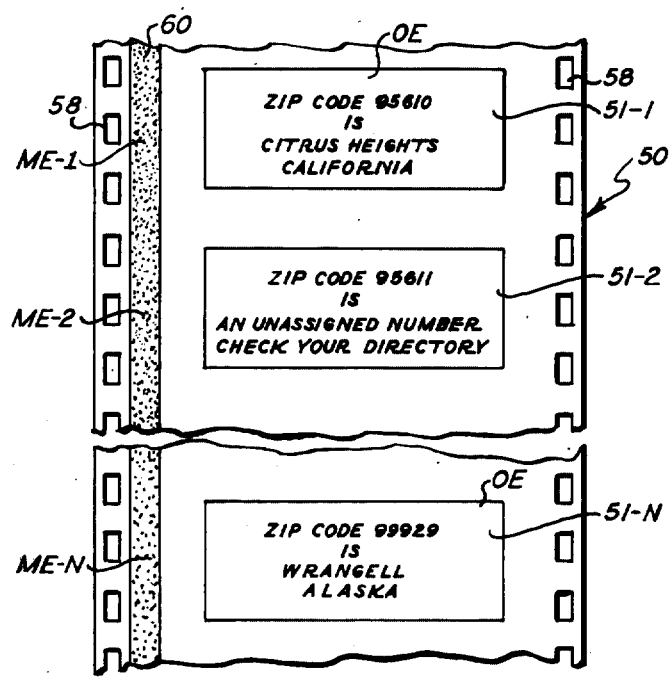
FIG. 3 is an enlarged view of a film strip incorporating the principles of the invention.

Referring now to FIG. 3, the data bank in the illustrated embodiment includes a portion of a film strip 50 which carries frames 51-1, 51-2...51-N, each of which carries all data pertaining to a selected zip code number, including an optical image OE and a magnetic recording strip element ME. There is one optical element and one magnetic element for each zip code number, and in the preferred simplified embodiment, they are in numerical sequence as in the Numerical List of Post Offices, by zip code and Sectional Centers as published by the U.S. Postal Service. The film has sprocket drive holes 58 for driving the film at a uniform rate of speed past a read head, as described in connection with FIG. 4.

As illustrated, frame 51-1 is for zip code number 95610 and the optical element in the frame (shown as same would be projected upon a viewing screen or window) reads "Zip Code 95610 is Citrus Heights, California" or some similar optical manifestation to the postal patron or customer that the zip code number 95610 as entered by him is that geographical location. As an alternative to a film strip all of the information could be stored on magnetic tapes, discs, drums etc. and translated to an optical manifestation by presentation upon an electronic display screen. Other information may be also be carried for visual presentation. An audio rendition of the visual presentation may also be presented to the user as an alternative or additional reinforcement to the user. Frame 51-2 carries the next sequential zip code, "zip code 95611" and since this number is not assigned to any given geographical location, the illustrated visual presentation to the user is "zip code 95611 is not an assigned number - CHECK YOUR DIRECTORY" or some similar optical or audio presentation. Frame 51-N carries "zip code number 99929 is Wrangell, Alaska" and is visually presented to the user. From time to time, new zip code numbers are assigned to geographical areas and some are discontinued and a new film strip may prepared when a significant number of such changes have been effected.

The magnetic element ME of each frame is a portion of a magnetic strip 60. This magnetic strip constitutes a further element of the data bank and carries coded computation factors corresponding to the postal rate to the destination post office. Thus with reference to zip code number 95610, the first three digits are known as the "prefix". The official zone chart for the local post offices of the sender contains the zone number, and consecutively numbered prefixes may have the same zone number. Thus, the magnetic element ME carries a magnetic code corresponding to the prefix (equivalent in zone number for computation) of the addressee post office relative to the sending post office or local station.

Surface parcel post rates are based on a computation, having been set up in "Parcel Post Rate Tables." In such tables (as published by the U.S. Postal Service), the zones (local zone, zones 1-2, 3, 4, 5, 6, 7 and 8) are set out along one edge of the table usally horizontal the top edge, and the weight of an article is set out along the side vertical edge. Hence if the weight and zone numbers are known the computation merely requires a lookup on the rate table chart. A sample chart is reproduced herein as follows:

Surface Parcel Post Rates:
Note: Any fraction of a pound over the weight shown takes the next higher rate.
Written matter may be included at extra cost.

| Weight, 1 pound and not to exceed | Local Zone | 1 – 2 | 3 | 4 | 5 | 6 | 7 | 8 |
|---|---|---|---|---|---|---|---|---|
| | | Third Class rates apply up to but not including one pound | | | | | | |
| 2 | $0.61 | $0.72 | $0.75 | $0.83 | $0.92 | $1.02 | $1.12 | $1.21 |
| 3 | .65 | .78 | .83 | .92 | 1.04 | 1.18 | 1.32 | 1.45 |
| 4 | .69 | .84 | .90 | 1.01 | 1.16 | 1.33 | 1.51 | 1.69 |
| 5 | .73 | .90 | .98 | 1.10 | 1.28 | 1.49 | 1.71 | 1.93 |
| 6 | .77 | .96 | 1.05 | 1.19 | 1.40 | 1.64 | 1.90 | 2.17 |
| 7 | .81 | 1.02 | 1.13 | 1.28 | 1.52 | 1.80 | 2.10 | 2.41 |
| 8 | .85 | 1.08 | 1.20 | 1.37 | 1.64 | 1.95 | 2.29 | 2.65 |
| 9 | .89 | 1.14 | 1.28 | 1.46 | 1.76 | 2.11 | 2.49 | 2.89 |
| 10 | .93 | 1.20 | 1.35 | 1.55 | 1.88 | 2.26 | 2.68 | 3.13 |
| 11 | .97 | 1.26 | 1.43 | 1.64 | 2.00 | 2.42 | 2.88 | 3.37 |
| 12 | 1.01 | 1.32 | 1.50 | 1.73 | 2.12 | 2.57 | 3.07 | 3.61 |
| 13 | 1.05 | 1.38 | 1.58 | 1.82 | 2.24 | 2.73 | 3.27 | 3.85 |
| 14 | 1.09 | 1.44 | 1.65 | 1.91 | 2.36 | 2.88 | 3.46 | 4.09 |
| 15 | 1.13 | 1.50 | 1.73 | 2.00 | 2.48 | 3.04 | 3.66 | 4.33 |
| 16 | 1.17 | 1.56 | 1.80 | 2.09 | 2.60 | 3.19 | 3.85 | 4.57 |
| 17 | 1.21 | 1.62 | 1.88 | 2.18 | 2.72 | 3.35 | 4.05 | 4.81 |
| 18 | 1.25 | 1.68 | 1.95 | 2.27 | 2.84 | 3.50 | 4.24 | 5.05 |
| 19 | 1.29 | 1.74 | 2.03 | 2.36 | 2.96 | 3.66 | 4.44 | 5.29 |
| 20 | 1.33 | 1.80 | 2.10 | 2.45 | 3.08 | 3.81 | 4.63 | 5.53 |
| 21 | 1.37 | 1.86 | 2.18 | 2.54 | 3.20 | 3.97 | 4.83 | 5.77 |
| 22 | 1.41 | 1.92 | 2.25 | 2.63 | 3.32 | 4.12 | 5.02 | 6.01 |
| 23 | 1.45 | 1.98 | 2.33 | 2.72 | 3.44 | 4.28 | 5.22 | 6.25 |
| 24 | 1.49 | 2.04 | 2.40 | 2.81 | 3.56 | 4.43 | 5.41 | 6.49 |
| 25 | 1.53 | 2.10 | 2.48 | 2.90 | 3.68 | 4.59 | 5.61 | 6.73 |
| 26 | 1.57 | 2.16 | 2.55 | 2.99 | 3.80 | 4.74 | 5.80 | 6.97 |
| 27 | 1.61 | 2.22 | 2.63 | 3.08 | 3.92 | 4.90 | 6.00 | 7.21 |
| 28 | 1.65 | 2.28 | 2.70 | 3.17 | 4.04 | 5.05 | 6.19 | 7.45 |
| 29 | 1.69 | 2.34 | 2.78 | 3.26 | 4.16 | 5.21 | 6.39 | 7.69 |
| 30 | 1.73 | 2.40 | 2.85 | 3.35 | 4.28 | 5.36 | 6.58 | 7.93 |
| 31 | 1.77 | 2.46 | 2.93 | 3.44 | 4.40 | 5.52 | 6.78 | 8.17 |
| 32 | 1.81 | 2.52 | 3.00 | 3.53 | 4.52 | 5.67 | 6.97 | 8.41 |
| 33 | 1.85 | 2.58 | 3.08 | 3.62 | 4.64 | 5.83 | 7.17 | 8.65 |
| 34 | 1.89 | 2.64 | 3.15 | 3.71 | 4.76 | 5.98 | 7.36 | 8.89 |
| 35 | 1.93 | 2.70 | 3.23 | 3.80 | 4.88 | 6.14 | 7.56 | 9.13 |
| 36 | 1.93 | 2.76 | 3.30 | 3.89 | 5.00 | 6.29 | 7.75 | 9.37 |
| 37 | 1.99 | 2.82 | 3.38 | 3.98 | 5.12 | 6.45 | 7.95 | 9.61 |
| 38 | 1.99 | 2.88 | 3.45 | 4.07 | 5.24 | 6.60 | 8.14 | 9.85 |
| 39 | 2.06 | 2.94 | 3.53 | 4.16 | 5.36 | 6.76 | 8.34 | 10.09 |
| 40 | 2.06 | 3.00 | 3.60 | 4.25 | 5.43 | 6.01 | 8.53 | 10.33 |
| 41 | 2.13 | 3.06 | 3.68 | 4.34 | 5.60 | 7.07 | 8.73 | 10.57 |
| 42 | 2.19 | 3.12 | 3.75 | 4.43 | 5.72 | 7.22 | 8.92 | 10.81 |
| 43 | 2.19 | 3.18 | 3.83 | 4.52 | 5.84 | 7.38 | 9.12 | 11.05 |
| 44 | 2.26 | 3.24 | 3.90 | 4.61 | 5.96 | 7.53 | 9.31 | 11.29 |
| 45 | 2.26 | 3.30 | 3.98 | 4.70 | 6.08 | 7.69 | 9.51 | 11.53 |
| 46 | 2.26 | 3.36 | 4.05 | 4.79 | 6.20 | 7.84 | 9.70 | 11.77 |
| 47 | 2.33 | 3.42 | 4.13 | 4.88 | 6.32 | 8.00 | 9.90 | 12.01 |
| 48 | 2.33 | 3.48 | 4.20 | 4.97 | 6.44 | 8.15 | 10.09 | 12.25 |
| 49 | 2.39 | 3.54 | 4.28 | 5.06 | 6.56 | 8.31 | 10.29 | 12.49 |
| 50 | 2.39 | 3.60 | 4.35 | 5.15 | 6.68 | 8.46 | 10.48 | 12.73 |
| 51 | 2.46 | 3.66 | 4.43 | 5.24 | 6.80 | 8.62 | 10.68 | 12.97 |
| 52 | 2.53 | 3.72 | 4.50 | 5.33 | 6.92 | 8.77 | 10.87 | 13.21 |
| 53 | 2.53 | 3.78 | 4.58 | 5.42 | 7.04 | 8.93 | 11.07 | 13.45 |
| 54 | 2.59 | 3.84 | 4.65 | 5.51 | 7.16 | 9.08 | 11.26 | 13.69 |
| 55 | 2.59 | 3.90 | 4.73 | 5.60 | 7.28 | 9.24 | 11.46 | 13.93 |
| 56 | 2.59 | 3.96 | 4.80 | 5.69 | 7.40 | 9.39 | 11.65 | 14.17 |
| 57 | 2.66 | 4.02 | 4.88 | 5.78 | 7.52 | 9.55 | 11.85 | 14.41 |
| 58 | 2.66 | 4.08 | 4.95 | 5.87 | 7.64 | 9.70 | 12.04 | 14.65 |
| 59 | 2.73 | 4.14 | 5.03 | 5.96 | 7.76 | 9.86 | 12.24 | 14.89 |
| 60 | 2.73 | 4.20 | 5.10 | 6.05 | 7.88 | 10.01 | 12.43 | 15.13 |
| 61 | 2.79 | 4.26 | 5.18 | 6.14 | 8.00 | 10.17 | 12.63 | 15.37 |
| 62 | 2.86 | 4.32 | 5.25 | 6.23 | 8.12 | 10.32 | 12.82 | 15.61 |
| 63 | 2.86 | 4.38 | 5.33 | 6.32 | 8.24 | 10.48 | 13.02 | 15.85 |
| 64 | 2.93 | 4.44 | 5.40 | 6.41 | 8.36 | 10.63 | 13.21 | 16.09 |
| 65 | 2.93 | 4.50 | 5.48 | 6.50 | 8.48 | 10.79 | 13.41 | 16.33 |
| 66 | 2.93 | 4.56 | 5.55 | 6.59 | 8.60 | 10.94 | 13.60 | 16.57 |
| 67 | 2.99 | 4.62 | 5.63 | 6.68 | 8.72 | 11.10 | 13.80 | 16.81 |
| 68 | 2.99 | 4.68 | 5.70 | 6.77 | 8.84 | 11.25 | 13.99 | 17.05 |
| 69 | 3.06 | 4.74 | 5.78 | 6.86 | 8.96 | 11.41 | 14.19 | 17.29 |
| 70 | 3.06 | 4.80 | 5.85 | 6.95 | 9.08 | 11.56 | 14.38 | 17.53 |

The chart can easily be set up on photographic film as a drum rotated by weighing scale and the zone number used to selectively energize a projection lamp to project the image of the chart portion in front of the lamp upon the viewing screen. However, it well be appreciated that in the present embodiment since in addition to being displayed, the print wheels of a label printer are set by electronic signals. Moreover when the postal patron desires additional service, such as insurance, certification etc. the additional fixed amounts for these services must be added to the computed charge which are easily added to the postal charge. Hence the computed amount maybe stored in a register and after the postal patron has selected the additional services, the charge for same is simply added to the computed charge and displayed on the display. At the same time the user's charge is displayed, a signal is sent to the printer for setting print wheels to the charge displayed (and also to set indicate the additional services requested, including printing a receipt for such additional services (see Wahlberg U.S. Pat. No. 3,290,491).

Referring now to FIG. 4, the film strip 50 is shown as passing between two reels 60 and 61, each having a sprocket 62 and 63 respectively engaged with sprocket holes on the film, read head 64 and display assembly 65. For purposes of simplicity, after each use the film strip 50 is rewound on supply reel 60 so that the first frame scanned by head 64 will be the lowest zip code number and each higher number is scanned in sequence. In this arrangement it may take a few seconds longer to present the highest zip code numbers 99929. However, one would not go beyond the invention by reading the zip code numbers on the frame in the viewing position at display assembly 65 and comparing same with the new zip code number entered by the postal patron and determining whether to search the upper or lower reel 60 or 61 according to whether the number is larger or smaller; nor would one go beyond the scope of the invention by counting the film sprocket holes to the desired zip code frame and reading only the computation factors from the film strip's magnetic element ME.

Console 70 having a simple numeric zip code entry keyboard 71 (which corresponds to lever switches 13-17) serves a an manual input for the entry of the zip code number by the postal patron. As each digit is entered it is displayed in windows 13W'-17W', respectively, and also sent to comparator 74. Entry of the first digit of the zip code number can, if desired, be used to initiate the drive of motor system M-2 which drives sprocket 63 and slip clutch 68 to take-up reeel 61. However it is preferred to use entry of the last digit of the zip code number as a signal on line 77 from comparator 74 to initiate operation of drive system M-2. Two signals are recorded on magnetic element ME, the first is a magnetic recording of the zip code number for the frame and the second recorded number is the zone number (or computation factor) used to compute the postage due for the parcel. The first magnetically stored number is read and compared in comparator 74 until a match or correlation is found with the manually inputted zip code number sent to the comparator 74 on line 75. When a match is found, the drive signal on line 77 to motor system M-2 is removed and motor M-2 is permitted to drive the film frame a predetermined distance from read head 64 to display position in display assembly 65. Light from a projection lamp 76 is projected through the film 50 and the indicia carried thereon is projected on screen 78 in indicator window 21 of FIG. 1.

The second magnetic recording is the computational factor and, upon a match being found in comparator 74, a comparator output signal is applied to open gate circuit 79 which permits the computational factor signal to be transmitted to the computation arrangement shown in FIG. 5.

In the rate chart above, two variables are required to compute the postage due for a parcel, the first being the computation factor or zone number equivalent and the second being the weight of the parcel. The weight of the parcel is determined by scale 11 which generates an electrical signal, on line 120.

The rate chart may be stored on an optical disc as shown in Furlong U.S. Pat. No. 3,594,735 or in a read only memory as shown in Salava U.S. Pat. No. 3,635,297.

The zip code number entered by the postal patron to the keyboard 71 is also used to print the zip code number in machine readable form directly on the parcel or as an adjunct to the stamp or postage label. Such machine readable form includes specialized fonts of character, bar codes as well as the dot code shown in FIG. 2. In the case of specialized fonts, a series of print wheels may be rotated or set to the desired zip code number and then after the postage meter print mechanism has been set, the postage and the zip code may be printed directly on the parcel or on a gummed label which is applied to the parcel, automatically or by the postal patron. Of course, as described earlier, the coin receiver 24, which is of the type shown in Wahlberg U.S. Pat. No. 3,290,491, controls the printing or label issuing mechanism 22.

Printing of the postage form and machine readable zip code shown in FIG. 6 is associated with a postage printer assembly having print members 90 positioned in a window 91 of a label printing plate 92, which also carries print members for the local station date and code guide elements 93. Window 94 is provided for printing zip code numbers in machine readable form. In this embodiment code dot printing elements 95, 96, 97, 98, and 99 are each carried on separately positioned carriers 95-C, 96C, 97C, 98C, and 99C respectively, the lower ends of which are coupled to digit drivers 100, 101, 102, 103, and 104, each of which receives a control signal for positioning the carrier and dot carried thereby in window 94 and relative to guide elements 93. There are ten separate carrier positions, one for each of the digits 0-9, and in the illustrated embodiment carrier 95C is positioned to print a dot in position 9, carrier 96C is positioned to print a dot in position 5, carrier 97C is positioned to print a dot in position 6, carrier 98C is positioned to print a dot in position 1, and carrier 99C is positioned to print a dot in position 0.

Figure 6A:
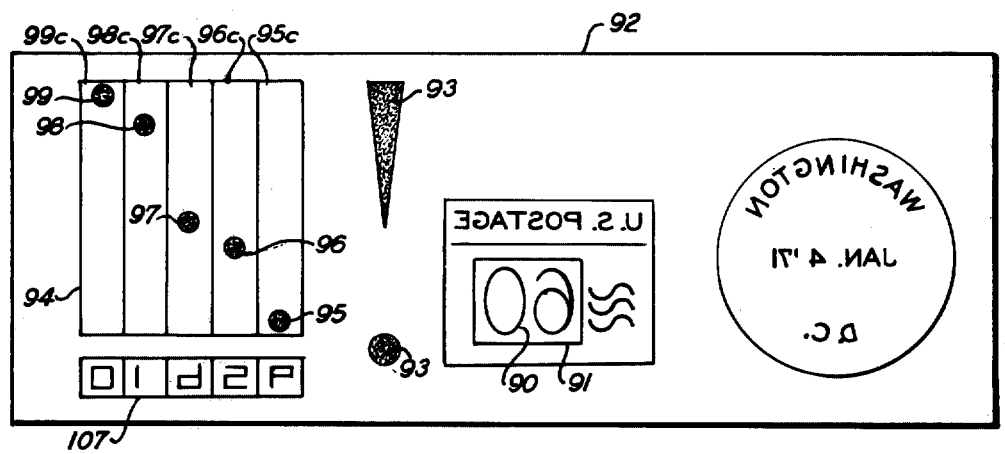
FIG. 6, including 6A through 6C, is a diagrammatic view of apparatus for printing machine readable zip code on a label on the parcel being mailed.
Figure 6B:
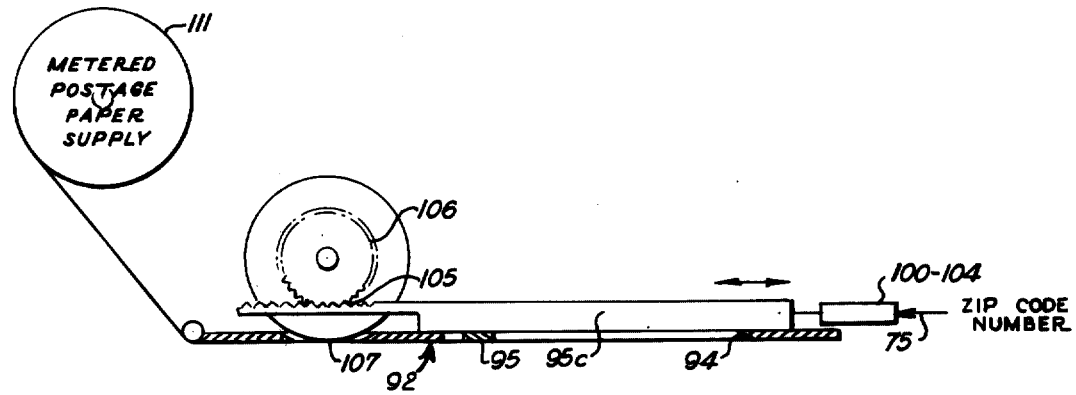

In FIG. 2 the zip code number is shown printed in human readable character 38 along with the dot code, and it will be appreciated that this printing can be in a form which is machine readable; the same signal which causes a positioning of the dot carriers is used to position a number print wheel, or the carriers 95C-99C may simply carry a gear rack 105 meshed with a pinion gear 106 on the number printing wheel 107 as indicated in FIG. 6B. Instead of printing a matrix of dots, a bar code as used by the postal service or point of sale article codes, may be printed on the parcel.

Figure 6C:
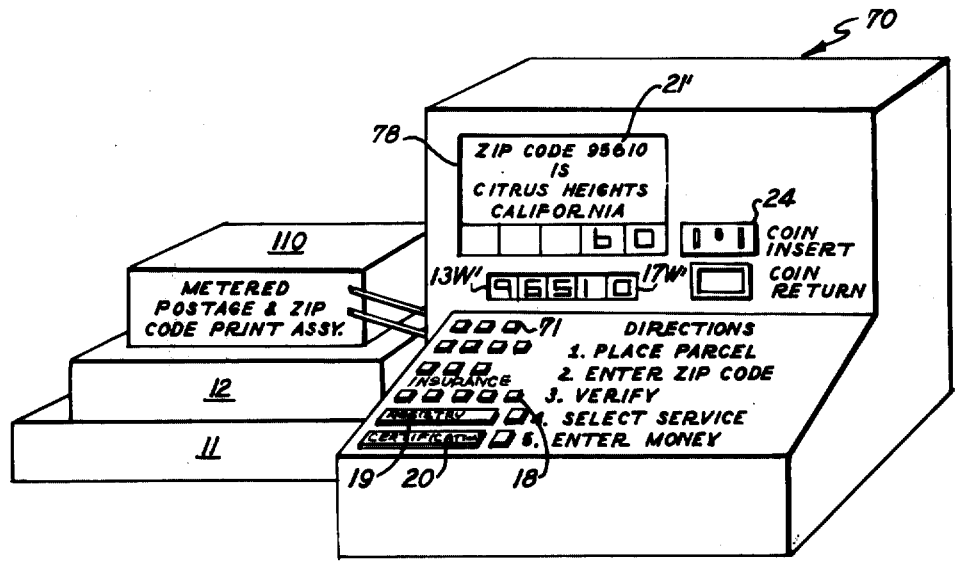

The printing assembly shown in FIG. 6A and (B) may print directly upon the parcel and at any location since the guide elements 93 permit the code to be accurately located as described in my patent identified above. However, since the parcel is on the scale 11, the tray or receiver of the scale can easily be adapted to permit the code to be printed directly on the package. As shown in FIG. 6(C) the print assembly 110 is positioned directly over an edge of scale 11 so that parcel 12 may have the postage printed directly thereon, or a label 92 fed from a label supply 111 (FIG. 6B) is gummed, severed from the supply and simultaneously printed and applied to the parcel, or printed and then applied to the parcel, and in the latter case, a back up member or pad is required during the print operation. In any case print assembly 110 is translated by driver linkage 112 (the drive motor not shown) to print-label applying position relative to the parcel 11. Upon completion of the printing-labeling operation, the print assembly 111 is returned to its rest position, and the code printing and postage printing elements are reset for a further operation.

Referring now to FIG. 5 the computation factor signal from read head 64 and the weight signal from scale 11 are utilized to calculate the postage due for the parcel 12 on scale 11. As indicated earlier the rate chart is stored in a form such that any portion thereof may be retrieved with the use of the parcel weight signal and the computation factor signal. Thus the weight signal on line 120 and the computation factor signal on line 121 are used to access a read only form of memory 122 which may be all electronic as in Salava U.S. Pat. No. 3,635,297, or electroptical as in Furlong U.S. Pat. No. 3,594,735. Further reference is made to Dlugos U.S. Pat. No. 3,692,988 which illustrates further the use of an optical read only memory similar to Furlong. The disclosures of these references are incorporated herein by reference.

As illustrated in FIG. 1, in addition to the basic fee calculated from the weight and computation factors, additional increments of charge may be added to the basic charge for insurance, registry certification etc. The calculated basic fee is stored in storage register 130. Since the charge for these services is usually a fixed amount (e.g. $0.01 to 15.00 of insurance liability requires a fee of $0.20, certification a fee of $0.30) the increments of these charges are simply added to the calculated basic charge in register 130 in essentially the same way such increments of service charges are added by the electromechanical additions of Wahlberg and the electronic Dlugos and are diagrammatically illustrated being scanned by a scanner 132 and inputted to register 130 and added to the calculated charge as described earlier.

The signal from register 130 is used to activate the display and indicate the charge to the user, to condition postage print unit 90 in print assembly 91 and to condition coin receiver 24 to accept the proper amount of money from the patron, and, if necessary, return any change. Again reference is made to the Wahlberg patent for disclosure of a coin receiver suitable for this purpose, it being evident that coin or currency receiving apparatus of almost any coin or currency operated vending machine may be used for this purpose. Upon receipt of the proper amount of money in coin receiver 24, a print command signal is sent to print assembly 110 which then prints the machine readable zip code and the rest of the materal shown in FIG. 2 either directly on the parcel 12 or on a label applied to parcel 12. After the printing operation is completed the print assembly is returned to a rest position and the apparatus is ready for further use.

I claim:

1. In a self service parcel mailing apparatus for entering to the postal system postal information manually entered by a postal customer for application to a parcel, said apparatus comprising scale means for receiving a package and producing a first signal corresponding to the weight thereof, zipcode number input means for manually entering all of the digits of a zipcode number, means responsive to a zipcode number manually entered on said zipcode number input means by said postal customer for producing a signal corresponding to the postage rate applicable to said parcel for the zipcode address manually entered by the postal customer, the improvement comprising means coupled to said zipcode number input means for indicating to said postal customer the geographical locality to which the manually inputted zipcode number corresponds as assurance that his manually entered zipcode number corresponds to the desired geographical locality, printing means responsive to said zipcode number for printing the manually entered zipcode number in machine readable form for application to said parcel at the point of entry of said parcel into the postal system for subsequent automatic parcel sorting in the postal system, and a postal customer operated means for generating a print signal for controlling said printing means to print said postal customer verified zipcode number in machine readable form on the parcel.

2. The invention according to claim 1 wherein the last said means additionally includes money-actuated means for controlling the printing of postage and machine readable zip code only after sufficient money has been inserted in the money-actuated means.

3. The invention according to claim 1 wherein the postage and zip code are printed on a label, and means for applying said label in a selected position on said parcel.

4. The invention according to claim 1 wherein the postage and machine readable zip code number are printed directly on said parcel.

5. In a self service postal station which is a part of a zipcode postal system, the method of verifying postal information manually entered by a postal patron, which comprises the steps of a. storing all zipcode numbers with a geographical description corresponding thereto in a memory, b. providing at said station a means for the postal patron to manually enter all of the digits of the zipcode number for verification, c. searching said memory to locate the zipcode number corresponding to the manually entered zipcode, and d. presenting to the postal patron the said geographical description corresponding to said manually entered zipcode number in human language form as reinforcement to the user that the manually entered zipcode number corresponds to the desired geographical destination of the user's postal article.

6. The invention defined in claim 5 wherein said step of presenting includes the step of presenting to the user in a human language form the said manually entered zipcode number with information concerning the status of said number when there is no geographical location assigned thereto.

7. The invention defined in claim 5 including the step of using said manually entered zipcode number to control a printing apparatus to print a machine readable form of said zipcode number after the presentation of said geographical description to said postal patron.

8. The invention defined in claim 7 wherein said printing is a printing of the zip code number in a human readable font of characters simultaneously with the printing of said zip code number in machine readable form.

9. The invention defined in claim 5 wherein said presentation is visual.

10. The invention defined in claim 5 wherein said presentation is oral.

11. In a postal system, the method for encouraging use of accurate address code numbers by postal patrons comprising:
1. inserting the digits of such numbers and correlated geographical description of the address into a memory,
2. upon the manual entry of said digits by a postal patron in said system retrieving the correlated geographical description to said patron and presenting same in a transient presentation corresponding to said digits in a form which can be used by said postal patron as a reinforcement and verification that he entered the correct digits of the address code number and thereby secure the accurate address code number in use in the postal system.

12. The method defined in claim 11 including the step of using the digits of the number manually entered by the postal patron to process a postal article to the geographical address when the postal patron has physically indicated to the system that the transiently presented geographical description of the address is the one desired.

* * * * *